(12) United States Patent
Harter

(10) Patent No.: US 7,426,521 B2
(45) Date of Patent: Sep. 16, 2008

(54) PROPERTY AND OBJECT VALIDATION IN A DATABASE SYSTEM

(75) Inventor: Steven V. Harter, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 10/623,168

(22) Filed: Jul. 18, 2003

(65) Prior Publication Data

US 2004/0019586 A1    Jan. 29, 2004

Related U.S. Application Data

(60) Provisional application No. 60/397,288, filed on Jul. 19, 2002.

(51) Int. Cl.
*G06F 17/30* (2006.01)
(52) U.S. Cl. .............. 707/103 R; 707/103 Z; 707/104.1; 707/200
(58) Field of Classification Search ........... 707/103, 707/104.1, 200
See application file for complete search history.

(56) References Cited

U.S. PATENT DOCUMENTS

| | | | | |
|---|---|---|---|---|
| 5,778,369 A | * | 7/1998 | Pascoe et al. | 707/100 |
| 6,275,787 B1 | * | 8/2001 | Baisley | 703/22 |
| 6,389,414 B1 | * | 5/2002 | Delo et al. | 707/4 |
| 6,681,383 B1 | * | 1/2004 | Pastor et al. | 717/126 |
| 6,732,331 B1 | * | 5/2004 | Alexander | 715/513 |
| 6,859,919 B1 | * | 2/2005 | Deffler et al. | 717/100 |
| 2002/0095406 A1 | * | 7/2002 | Mc George, Jr. | 707/3 |
| 2003/0191731 A1 | * | 10/2003 | Stewart et al. | 706/47 |

\* cited by examiner

*Primary Examiner*—Charles Rones
*Assistant Examiner*—Phuong-Thao Cao
(74) *Attorney, Agent, or Firm*—Westman, Champlin & Kelly, P.A.

(57) ABSTRACT

Property and object validation is provided in a framework for authoring database systems. The framework treats a property as an object and provides a mechanism to allow constraints to be enforced on the values entered in the properties. Some objects of an application have properties that have dependencies on other properties for setting. The framework of the present invention also allows easy enforcement of such dependency constraints.

11 Claims, 15 Drawing Sheets

```
class myClass {
  ...
  private string myString;
  ...
  [StringValidator (MinLength=16, MaxLength=64)]
  public string myProp {
    get {return myString;}
    set {
      # region Framework : Before property set
      object _property = GetProperty(System.Reflection.MethodBase.GetCurrentMethod());
      PropertyValueChangingEventArgs _args =
            new PropertyValueChangingEventArgs(value);
      OnPropertyValueChanging(_property, _args);
      if (_args.Canceled) return;
      #endregion
      myString = value;
      #region Framework; After property set
      OnPropertyValueChanged(_property);
      #endregion
    }
  }
  ...
}
```

FIG. 7

```
class myClass {
    ...
    private string myString;
    ...
    [StringValidator (MinLength=16, MaxLength=64, IsReadOnlyMode = IsReadOnlyMode.IsNew)]
    public string myProp {
    get {return myString;}
    set {
        # region Framework : Before property set
        object _property = GetProperty(System.Reflection.MethodBase.GetCurrentMethod());
        PropertyValueChangingEventArgs _args =
            new PropertyValueChangingEventArgs(value);
        OnPropertyValueChanging(_property, _args);
        if (_args.Canceled) return;
        #endregion
        myString = value;
        #region Framework; After property set
        OnPropertyValueChanged(_property);
        #endregion
    }
    ...
}
```

FIG. 8

```
class myClass {
    ...
    private string myString;
    ...
    [StringValidator (MinLength=16, MaxLength=64, IsReadOnlyMode =
        IsReadOnlyMode.PropertyIsReadOnly, IsReadOnlyPropertyLink = name of a property)]
    public string myProp {
    get {return myString;}
    set {
        # region Framework : Before property set
        object _property = GetProperty(System.Reflection.MethodBase.GetCurrentMethod());
        PropertyValueChangingEventArgs _args =
            new PropertyValueChangingEventArgs(value);
        OnPropertyValueChanging(_property, _args);
        if (_args.Canceled) return;
        #endregion
        myString = value;
        #region Framework; After property set
        OnPropertyValueChanged(_property);
        #endregion
    }
    ...
}
```

FIG. 9

| COMPANY_ID 1052 | ORDER_ID 1054 | ORDERLINE_ID 1056 | SERIAL NO. 1058 | OTHER COLUMNS | |
|---|---|---|---|---|---|
| | | | | | |
| | | | | | |
| | | | | | |
| | | | | | |
| ... | ... | ... | ... | ... | ... |
| | | | | | |

PROPERTY AND OBJECT VALIDATION IN A DATABASE SYSTEM

CROSS-REFERENCE TO RELATED APPLICATION

The present application is based on and claims the benefit of U.S. provisional patent application Ser. No. 60/397,288, filed Jul. 19, 2002, the content of which is hereby incorporated by reference in its entirety.

BACKGROUND OF THE INVENTION

The present invention relates to database systems.

In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational data base are formulated in a query language. One such language is SQL (Structure Query Language) which is widely used in commercial relational data base systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Data base queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented data base systems. These systems offer more complex data types in order to overcome the restrictions of conventional relational databases. In the context of object oriented data base models, an "object" includes both data and the functions (or methods) which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented databases are not yet as widely used in commercial products as relational databases.

Yet another database technology attempts to combine the advantages of the wide acceptance of relational data bases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

The aforementioned database systems provide means for storing complex information in financial and business applications to name a few. By way of example, a business application may include objects that relate to customers, which in turn are related to various locations that they may have operating plants, types of products that each of these plants may order, the cost of such products, shipping dates, etc. The data for such information can be stored as properties of objects. However, some or all of the values that can be entered in the properties must be within acceptable ranges to avoid run-time errors, or worse, errors that do not necessarily cause a runtime error, but would corrupt the reliability of the application to maintain such data. For instance, many business objects are complex and part of that complexity is related to property dependency. For example, for a line item on a sales order object, the line items inventory identifier property may need to be set before the line items unit price property. If a consumer or user of the application is allowed to set the unit price property before the inventory identifier property, and then the consumer or user sets the inventory identifier property, the unit price property may be incorrect if there is an association between the item identified by the inventory identifier property and its unit price. An author designing such application will add code or instructions to handle this situation. However, in view of the complexity of the application this code may have to be duplicated for every property that needs to be set, and adjusted as necessary given the property that is being set. A heavy burden is thus placed upon the application author to maintain accuracy and consistency in order that the application executes correctly.

A method and/or system that can simplify the validation of properties would be highly beneficial.

SUMMARY OF THE INVENTION

Property and object validation is provided in a framework for authoring database systems. The framework treats a property as an object and provides a mechanism to allow constraints to be enforced on the values entered in the properties. Some objects of an application have properties that have dependencies on other properties for setting. The framework of the present invention also allows easy enforcement of such dependency constraints.

BRIEF DESCRIPTION OF THE DRAWINGS

FIGS. 7, 8 and 9 are first exemplary code for validating a property.

FIG. 15 is a pictorial representation of a database table.

DETAILED DESCRIPTION OF ILLUSTRATIVE EMBODIMENTS OVERVIEW

It should be noted that the inventive features of the invention can be applied to O-R databases or relational databases, because the invention bridges the capabilities of both types of databases as well as the capabilities of object oriented programming languages. The result is an O-R database system that provides significant advantages over prior database technology. It will be described herein in terms of applying to an O-R database, for the sake of illustration only, as it is equally beneficial for relational databases.

Figure 1:
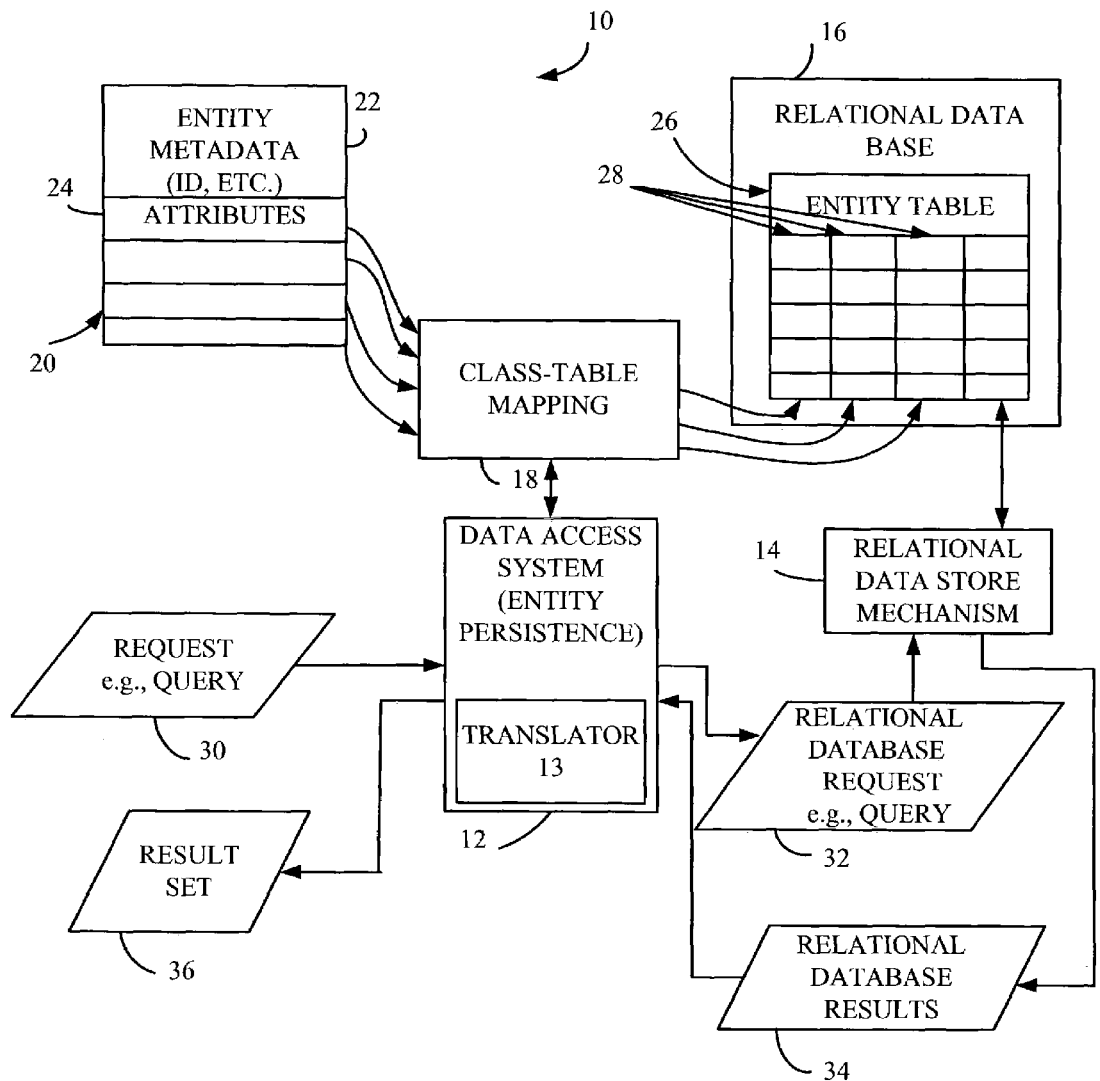
FIG. 1 is a block diagram of one embodiment of an object-relational data storage system.

FIG. 1 is a block diagram illustrating one embodiment of a data storage and accessing system 10 in accordance with the present invention. System 10 includes data access system (or entity persistence system)12, relational data store mechanism 14, relational database 16, and class-table mapping 18. System 10 is illustratively an object-relational (O-R) data storage system in which stored data can be referred to in terms of entities (or objects) and their properties, rather than elements of the data base schema, such as tables and columns. FIG. 1 illustrates one mechanism for doing this.

As shown in FIG. 1, the data can be organized in terms of entities 20 (which is used interchangeably herein with the term objects). Each entity illustratively includes a metadata portion 22 and a remaining attributes or properties portion 24. The metadata portion 22 describes the entity 20, while the remaining attributes 24 define further attributes of entity 20, such as the data stored therein. Each of the attributes in entity 20 is mapped to a corresponding entity table 26 and a specific column 28 in a given entity table 26.

Data access system 12 can receive various forms of requests such as a query 30 which specifies an entity, or portions of an entity or group of entities, to be retrieved. Query 30 can illustratively be expressed in terms of objects ("entities") and properties, rather than in terms of tables and columns. The particular manner in which queries are expressed is not relevant to the present invention.

In any case, data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a SQL SERVER database server such as that available from the Microsoft Corporation of Redmond, Wash., that accesses a relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Data access system 12 hides the physical data store (mechanism 14 and database 16) from the users and developers enabling them to work in terms of entities rather than requiring them to know both the schema of database 16 and the syntax of the particular data store mechanism 14. Before describing the invention in greater detail, FIG. 2 shows one embodiment of an environment in which the present invention can be used.

Figure 2:
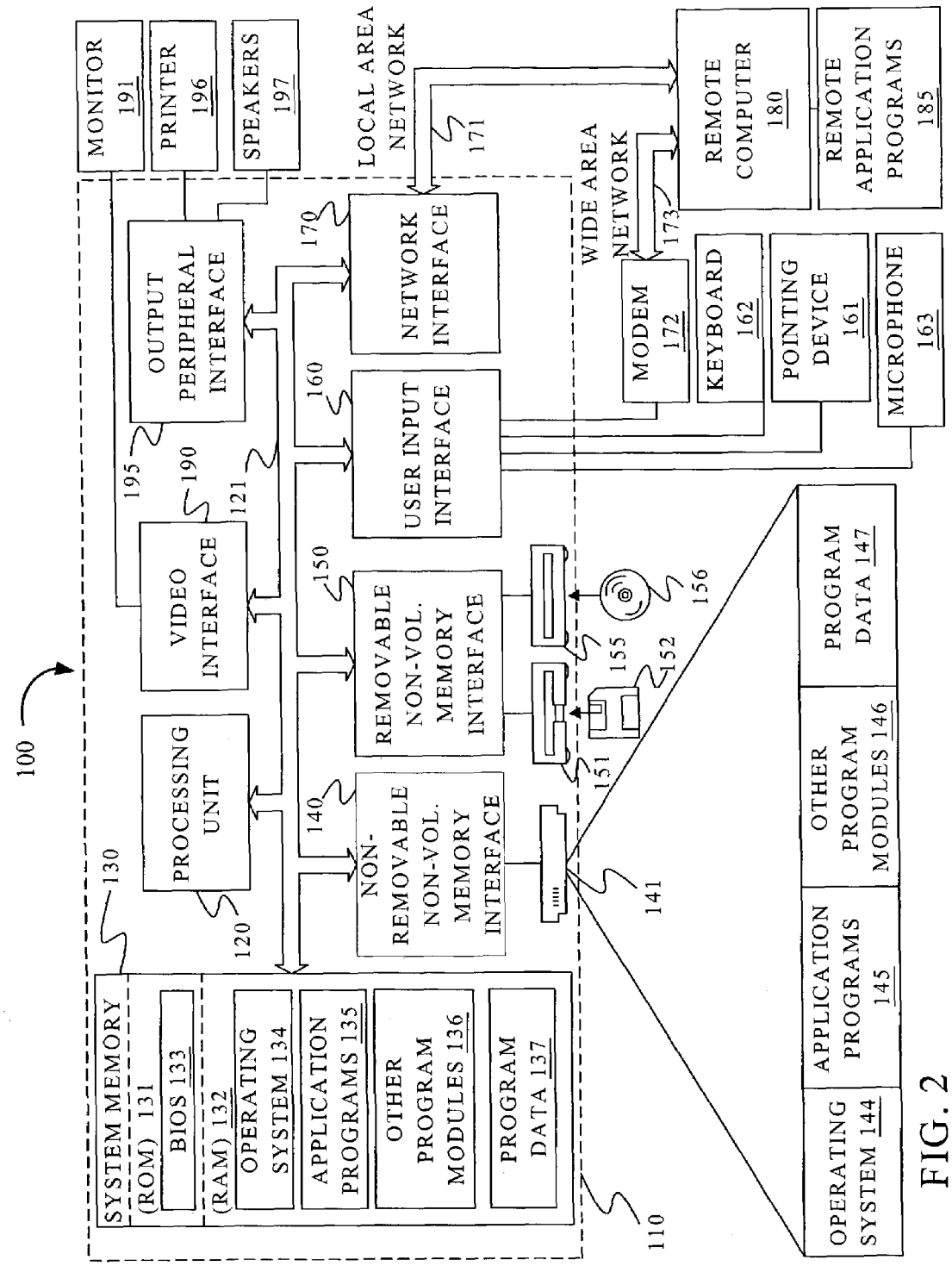
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

Criteria Object Model

Figure 3:
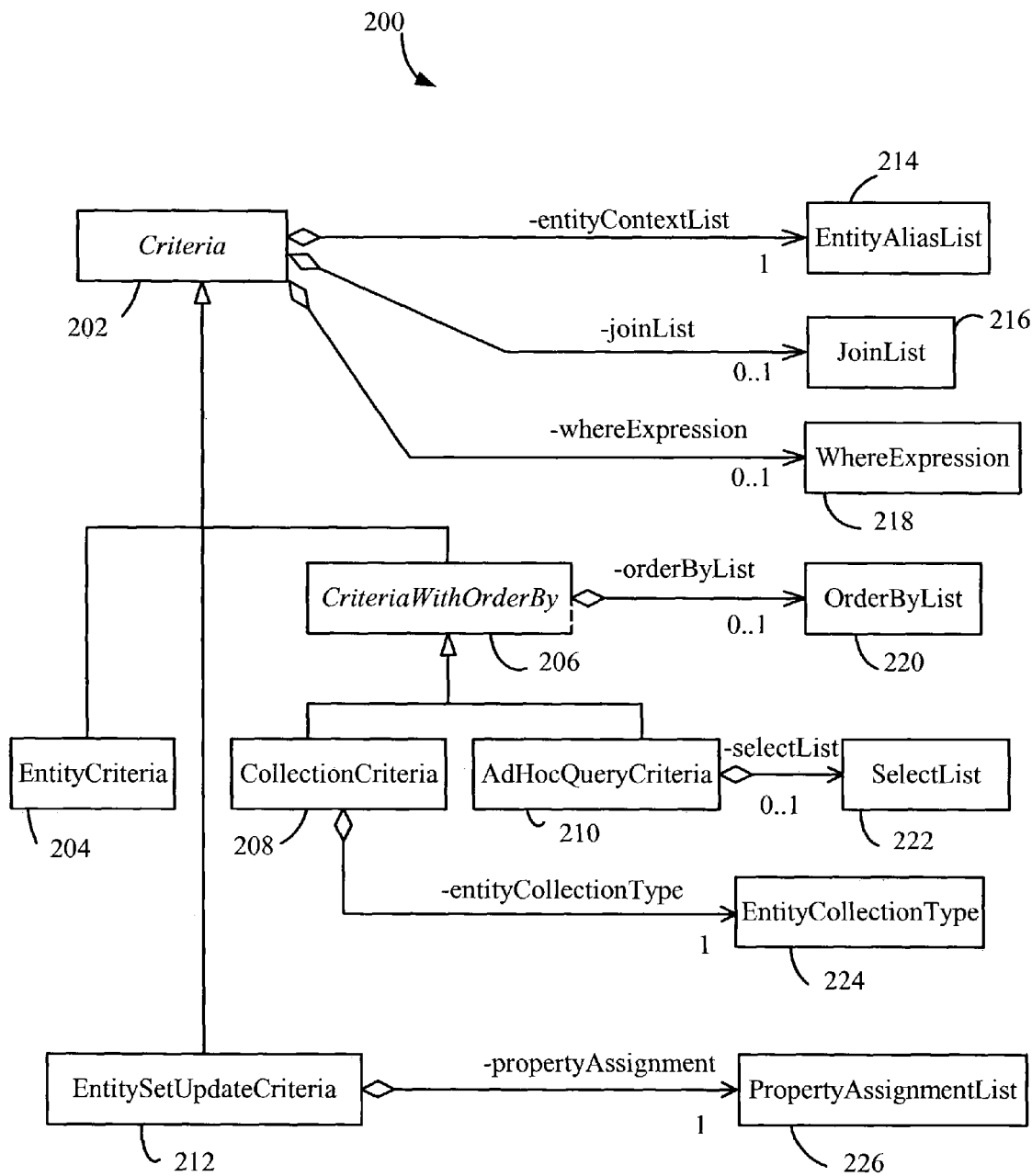
FIG. 3 is a UML object model class diagram in accordance with one exemplary embodiment for practicing the present invention.

FIG. 3 shows a UML class diagram implemented by data access system 12. The class diagram shown in FIG. 3 defines what is referred to as a criteria subsystem 200. Criteria subsystem 200 enables users and developers to define criteria, which describe the entity or entities being queried, updated or deleted; or the entity or entities on which set operations are being performed. Each of the objects in FIG. 3 includes an application programming interface that exposes a variety of different methods which are not necessary for understanding the concepts of the present invention. A number of the features of the various objects, and methods exposed thereby, are discussed in the body of this description for the sake of clarity.

Object model 200 includes the following classes: Criteria 202, EntityCriteria 204, CriteriaWithOrderBy 206, CollectionCriteria 208, AdHocQueryCriteria 210, EntitySetUpdateCriteria 212, EntityAliasList 214, JoinList 216 WhereExpression 218, OrderByList 220, SelectList 222, EntityCollectionType 224 and PropertyAssignmentList 226.

In the diagram shown in FIG. 3, the hollow arrows define an "IS A" relationship. For example, EntityCriteria is a Criteria, and EntitySetUpdateCriteria is also a Criteria. The connectors having a diamond at one end and an open arrow at the other end illustrate that the class which is pointed to by the diamond holds a reference to the class that is pointed to by the open arrow. Thus, the Criteria class holds a reference to the EntityAliasList class. The numerals adjacent the open arrows indicate the number of references which are held. Therefore, each Criteria class 202 holds a reference to an EntityAliasList 214 and can hold a reference for up to one JoinList 216 and WhereExpression 218.

Criteria class 202 is the abstract base class for which each of the concrete criteria classes (EntityCriteria 204, CollectionCriteria 208, AdHocQueryCriteria 210, and EntitySetUpdateCriteria 212) are derived either directly or indirectly. Criteria class 202 holds references to instances of EntityAliasList 214, JoinList 216 and WhereExpression 218 which are exposed through public properties with the same names.

Criteria class 202 also defines a large set of static methods that are used to create Criteria instances and the components that are stored in them. The constructors of all public Criteria classes are internal. This means that all users of Criteria 202 must use the static methods of the abstract Criteria class for instance creation. Criteria 202 cannot be instantiated since it is abstract.

EntityCriteria 204 is used to specify a single entity for retrieval. It is derived directly from the abstract Criteria 202, and thus inherits the EntityAliasList 214 referenced by Criteria 202 as well as the JoinList 216 and WhereExpression 218 properties referenced by Criteria 202. An instance of EntityCriteria 204 can be created by creating an EntityKey from which an EntityAliasList 214 and a WhereExpression 218 are internally generated, or by providing the instance of EntityAliasList 214 and WhereExpression 218 directly.

CriteriaWithOrderBy 206 is derived from the abstract Criteria class 202 and thus inherits the properties referred to by Criteria 202. CriteriaWithOrderBy 206 holds a reference to an instance of OrderByList 220 which is exposed by a public property. CriteriaWithOrderBy 206, as with Criteria 202, cannot be instantiated since it is abstract.

CollectionCriteria 208 is used for the retrieval of a collection of entities. It is derived from CriteriaWithOrderBy 206, inheriting the EntityAliasList 214, JoinList 216, WhereExpression 218 and OrderByList 220 properties of CriteriaWithOrderBy 206 and Criteria 202. CollectionCriteria 208 adds an EntityCollectionType 224 which is exposed as a public property as well.

AdHocQueryCriteria 210 is used for the retrieval of entity data. It allows the user to combine the data of multiple entities of different types into a single result row with only the properties of interest included. The results of an AdHocQueryCriteria 210 query are returned in the form of a tabular result (or data) set, such as, for example, a Microsoft ADO.NET DataSet. The AdHocQueryCriteria 210 is derived from the abstract CriteriaWithOrderBy 206 class inheriting the properties EntityAliasList 214, JoinList 216, WhereExpression 218, and OrderByList 220. AdHocQueryCriteria 210 adds a SelectList 222 which is exposed as a public property.

EntityAliasList 214 is used to contain a list of entity aliases (parent key, entity type pairings) that are used with instances of Criteria 202. The entity alias list associated with an instance of Criteria 202 enables data access system 12 to determine which server and database to work with, and which maps 18 to use for mapping entity properties to the database tables and columns. It also allows specifying the same entity with different names ("aliases") so that things such as self-joins can be performed. For EntityCriteria 204, the EntityType indicates the type of entity to instantiate. For CollectionCriteria 208, it indicates the type of entities to instantiate and put in a collection. Also, the entity type can be a base type. Therefore, the instances that are put into the collection may actually be descendents of an indicated entity type. For all types of Criteria 202 multiple entity aliases can be passed to the EntityAliases clause upon creation of Criteria 202. This allows all types of Criteria 202 to make explicit joins to arbitrary entities.

JoinList 216 is used to contain a list of explicit joins for an instance of Criteria 202. Each join includes a join type (such as inner, left, or right), a left alias name, a right alias name, and a Boolean expression that defines the relationship between the entities involved in the join.

Where Expression 218 is used to specify the entity of interest. For CollectionCriteria 208, it is used to specify a set of entities. For AdHocQueryCriteria 210 it specifies the data rows to retrieve.

OrderByList 220 is used to define the sort order of the collection retrieved for a CollectionCriteria 208, or the sort order of the returned tabular result (or data) set rows for an AdHocQueryCriteria 210. The list contained in OrderByList 220 includes a list of properties or select list aliases. Each of these can be followed by an optional sort type indicator, such as ascending or descending.

SelectList 222 is used in the AdHocQueryCriteria 210 to define the columns that will appear in the resulting data set. A SelectList 222 can contain properties or expressions and each of these can be followed by an optional alias. An alias acts as an alternate name for the property or expression that follows. The aliases can also be used in the OrderByList 220.

EntityCollectionType 224 is used to define the container type of a collection of an instance of CollectionCriteria 208. In other words, it defines the system type of the collection in which the retrieved entities are to be placed.

EntitySetUpdateCriteria 212 is used to update a set of entities. It allows the user to modify one or more properties of similarly constructed entities. The operation is similar to modification of data in one or more columns with respect to a set of rows, and in effect, EntitySetUpdateCriteria 212 accomplishes that purpose in the database. However, instead of referencing in the modification request based on columns of the database, referencing is provided by entity properties.

EntitySetUpdateCriteria 212 is derived from the abstract Criteria 202 inheriting the properties EntityAliasList 214, JoinList 216 and WhereExpression 218. EntitySetUpdateCriteria 212 adds a PropertyAssignmentList 226, which is exposed as a public property.

Property Validation

One aspect of the present invention pertains to updating or changing values and properties of objects, and in particular, providing a framework for the application author that allows the application author to provide value constraints and/or property update ordering (dependency) constraints for objects that can be implemented easily. This aspect obviates or at least substantially reduces the need for the application author to manually code such property constraints of objects in the application. This reduces code duplication, the time to code the application as well as inconsistencies that can inhibit performance and delay implementation of the application. The framework maintains the constraints and at run time enforces the constraints when property data is entered by a consumer, i.e., one entering in data.

At this point, it should be noted that data for a property can be entered by a user or a consumer through a suitable user interface or from entering of data from other means, such as, but not limited to, importing data through files or messages where the property values are contained within the files or messages. Thus, it should be understood that aspects of the present invention may not be limited to only receiving data directly from a user or consumer of the application, but rather aspects of the present invention can be used anywhere in the application as desired by the application author as well as across the system implementing the application, for example, where portions of the application for entering in data are executed across a distributed network.

Figure 4:
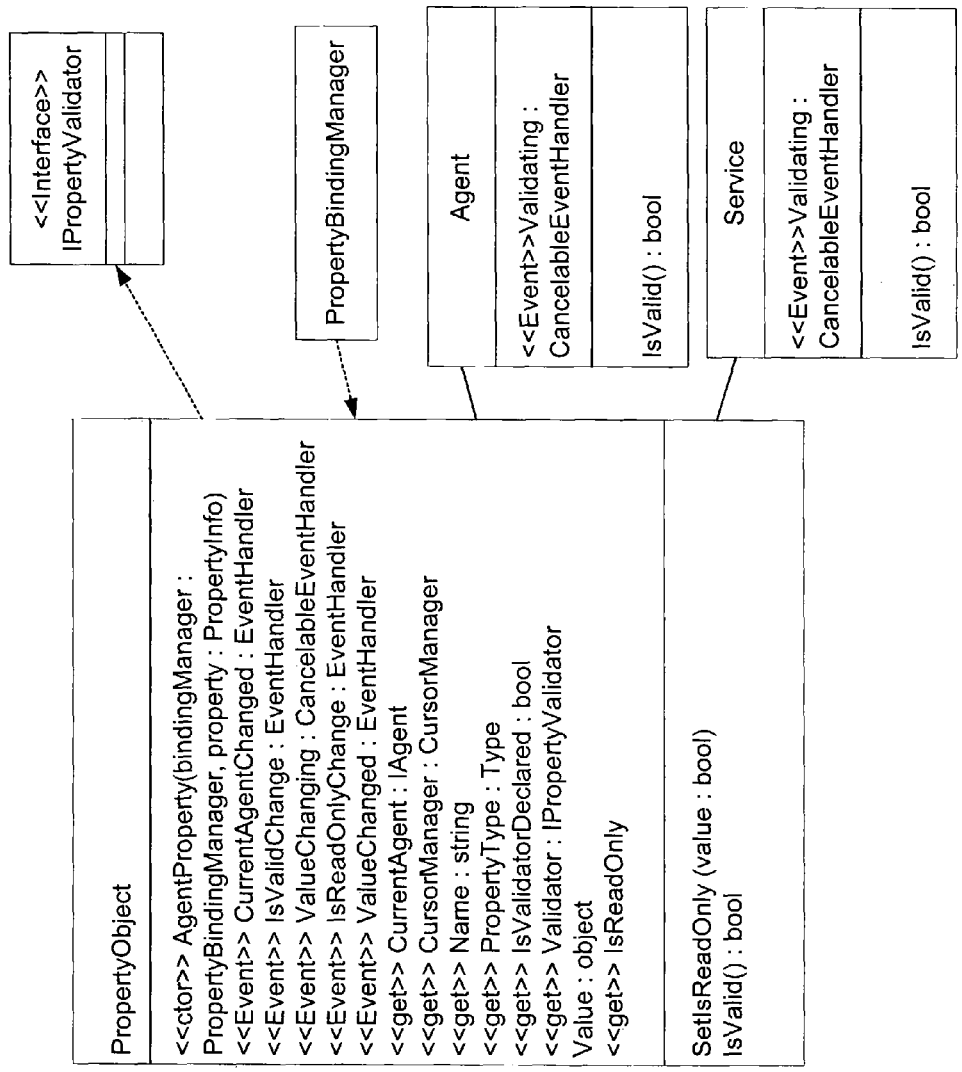
FIG. 4 is a UML object model of a PropertyObject.
Figure 5:
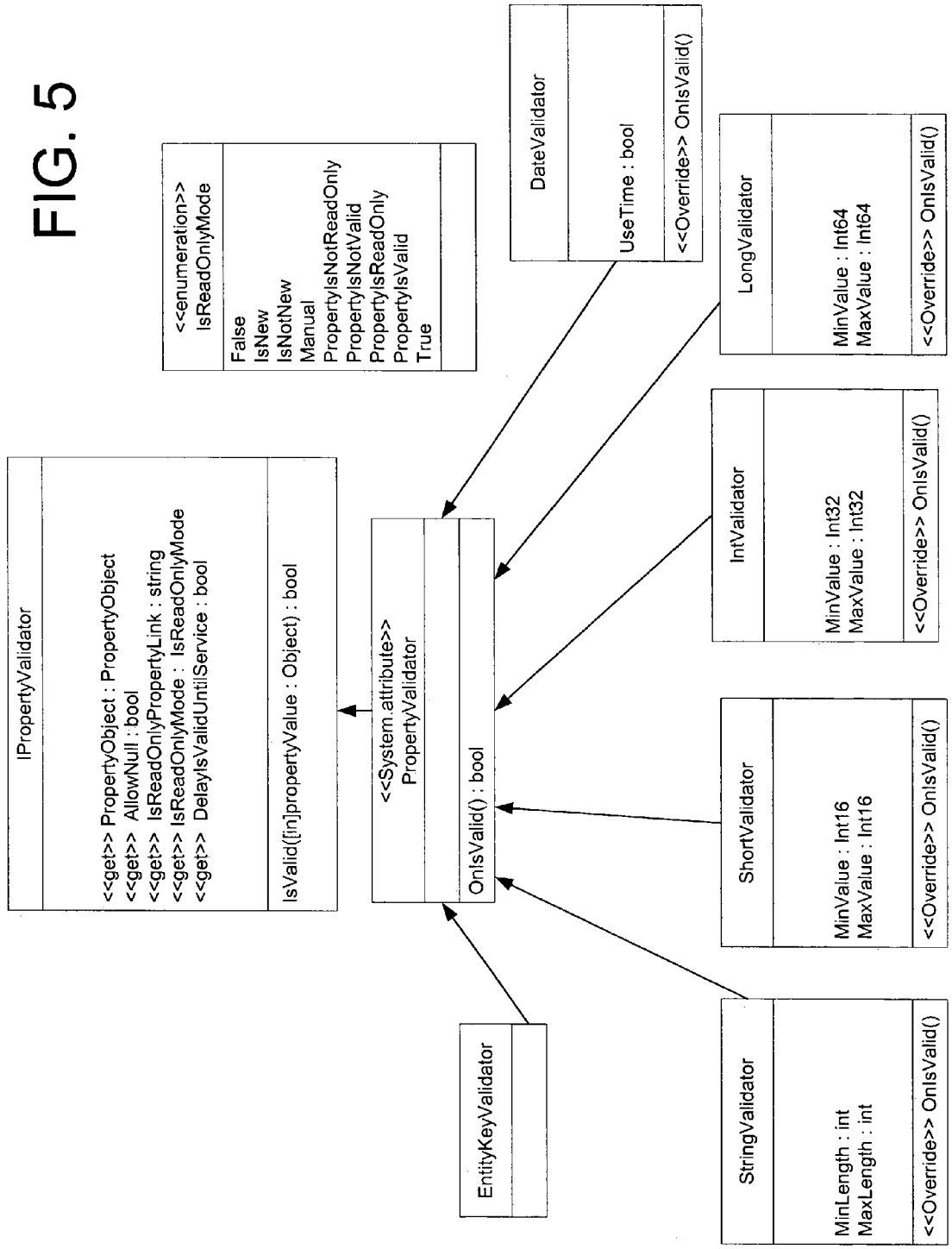
FIG. 5 is a UML object model for a PropertyValidator.

Briefly, as one aspect of the present invention, a method or system (framework) treats a property of an object or entity as an object (herein referred to as PropertyObject) in order to provide validation and enforce constraints. FIG. 4 illustrates elements of the PropertyObject. The constraints are implemented by a PropertyValidator, which is illustrated in FIG. 5. A PropertyObject has a reference to a PropertyValidator, which is a class used to determine if a given property is valid. In the illustration of FIG. 5, specific types of property validators are denoted as StringValidator, ShortValidator, IntValidator, LongValidator, DataValidator and EntityKeyValidator. The specific validators other than the EntityKeyValidator apply constraints such as maximum and minimum values, and whether such constraints can be overridden that are specified as metadata at design time by the application author when validation is desired upon a property. The EntityKeyValidator however pertains to maintaining parent and child relationships of objects. The Appendix below describes a Containment Hierarchy that the EntityKey supports as well as the EntityKey itself. To facilitate the validation of new or evolving property types, it is easy to author a new property validator that the PropertyObject uses.

As illustrated in FIG. 5, constraints can include, but are not limited, to a minimum and/or maximum value of an integer, the minimum or maximum length of a string and whether or not a time entry or value is considered valid just to name a few. In a further embodiment, the metadata can include constraints related to the proper order in which properties of an object or entity need to be set (as specified in PropertyValidator). Such objects having dependency are also referred to as "modal objects". An aspect of the present invention is able to determine if a property of an object has met its dependencies for setting. If a property has not met its dependencies for setting, the property is said to be "read-only", which inhibits the user or consumer or other mechanism from setting the property.

An example of a modal object may be helpful. Consider a sales order object having an InventoryItemID property, as well as UnitPrice property. In this example, it is desirable to ensure that the InventoryItemID property is set before the corresponding UnitPrice property is set. In this example, it is assumed that a corresponding value for the UnitPrice property exists for each InventoryItemID. If a consumer were allowed to set the UnitPrice property before the InventoryItemID property, then when the InventoryItemID is finally set, a non-intuitive decision will need to be made or resolved. In particular, is it proper to leave the UnitPrice property unchanged, or is it proper to overwrite the UnitPrice property as if the user consumer had not set the UnitPrice property already, or is it proper to ask the consumer what to do.

Figure 6:
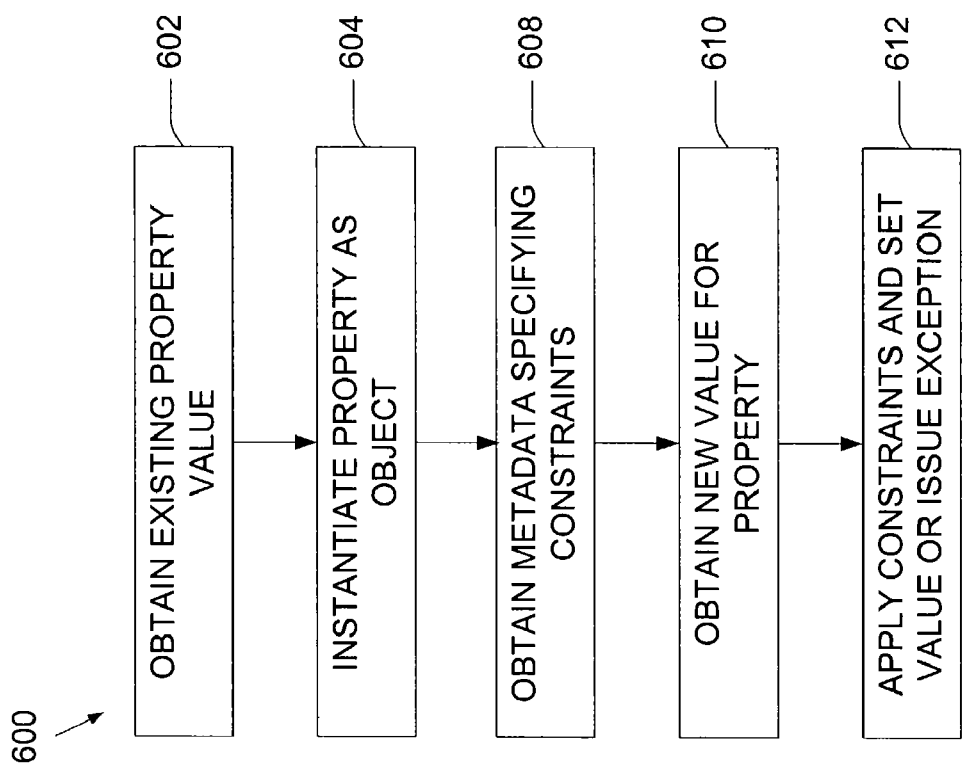
FIG. 6 is a method for validating a property.

Having a decision like this is best avoided by forcing a consumer to set the InventoryItemID property before the UnitPrice property. FIG. 6 generally illustrates steps in a method 600 involved for obtaining metadata and performing validation. Step 602 is optional and indicates that an existing property value, if any, can be obtained from the object under consideration as currently stored in the system. Commonly, such functions are referred to as "property getters", the syntax which may vary from programming language to programming language. At step 604, the property is instantiated as an object (herein referred to as PropertyObject).

Corresponding metadata specifying the constraints for validation is obtained at step 608, while the new value for the property is obtained as step 610. If at step 610 the new value for the property corresponds to the existing value, the method of property validation can exit at this point since there is no need to perform validation on a value that the property already has. As appreciated by those skilled in the art, the order of steps 602, 604, 608 and 610 should not be considered limiting in that the order may be changed without effecting the functionality of performing validation. At step 612, the constraints are applied to the new value for the property where upon if the constraints are met, the property value is set to the new value, whereas if the constraints are not met, an exception or error is issued.

In yet a further embodiment, an event can be issued to indicate the processing of validation of properties. For instance, an event can be issued indicating that a property may be changing based upon on its current value and the value under consideration. This event may be useful in order to provide an extensibility mechanism to cancel the event (i.e. canceling the validation procedure if the property value will not be changed), or to provide additional validation not performed by the PropertyValidator. Other events that can be issued include issuing an event indicating that the property has changed or its status has changed from or to read-only, or its status has changed from or to being valid.

As will be explained further below, but as mentioned above, some properties may be dependent upon the setting or status of another property. As indicated above, each property of an object is instantiated as a PropertyObject, which in turn, can listen for the notification or events issued during the setting process. In this manner, the application author can allow the application to change the status of properties from "read-only" to a status that can be set. For instance, for a user interface that allows the consumer or user to enter data associated with various properties of an object through text boxes or other suitable fields, some of the fields may not be active, thus inhibiting the user from entering data therein. However, as data is entered into fields associated with properties that can be entered, depending upon the desired application logic of the application author, other fields can be "turned-on", thereby allowing the consumer to enter data therein. In other words, each of the instances of PropertyObject for the various properties can listen and respond according to the events issued by other instances of PropertyObjects.

FIG. 7 illustrates exemplary code provided by an application author to provide property validation. Generally, the code can follow a template that includes designation of a class for the property at 701, which can include private variables 702, if necessary. Proper code is then provided for getting and setting the property, the syntax of which may vary from application language framework to application language framework. In the example illustrated in FIG. 7, the get function is indicated at 703 and setting begins 705. It should also be noted that the property to be validated is normally publicly available, but does not have to be.

The type of validator to be used is indicated at 706. As illustrated in FIG. 5, validators operate on a particular type of data type for a property. Thus, if an appropriate validator exists, it is specified at this location. However, it should be noted that in a further embodiment if no validator is specified, a default validator for the property type can be applied. In the example provided in FIG. 7, this would be StringValidator, wherein default values for attributes of the validator would then be used. In the example illustrated, StringValidator is explicitly specified along with specific attributes at 708.

Section 710 and 712 of the code comprise syntax for performing the setting function both before and after assignment of the new property value, which is indicated at 714. In section 710, events can be issued indicating that the property value is changing, while in section 712 an event can be issued indicating that the value has changed. Code 715 illustrates that property validation can cease if in the event the new value obtained corresponds to the existing value for the property.

It should also be noted that custom validators can be derived from the PropertyValidator illustrated in FIG. 6, if necessary. Generally, creation of a new validator includes creating a new class and deriving it from the PropertyValidator. An AttributeUsage attribute to the class definition can be added to indicate that the attribute may be used only on a property and is single-use. An abstract virtual OnIsValid base method is provided. Attribute properties needed to support the custom validator, such as a minimum length, a maximum length, a set of allowable characters, etc. are determined. New private fields are added to support the properties are also added. OnIsValid is implemented to perform validation on the input parameter and return a pass or fail result. If the custom validator is being added because of a new data type, a TypeValidatorAttribute is added to the date type specifying the new validator class. This causes the new validator to be used as the default validator for any property of the data type if there is not a validator specified on the property. (Similar to use of the StringValidator on any string property, even if the StringValidator is not specified on the property—a default string validator could prevent setting a property to a value of 'null', which is a common validation scenario for a string property)

As indicated above, one form of constraint that can be applied to the setting of properties can control when a property is made available to the user consumer for setting, e.g. its status of read-only is changed. In other words, as described above, in some circumstances it may be desirable to have the property available for setting only after another property has been previously set. PropertyObject has an IsReadOnly property that reflects whether the property can be set, and whether it has met all its dependencies. The IsReadOnly property is governed by the corresponding validator's IsReadOnlyMode property which can either be set to a manual mode, where the IsReadOnly value can be changed manually at run-time or one of several automatic modes which include the following:

False (this is the default). IsReadOnly is always false.

True. IsReadOnly is true, unless the object is read only or there is no property setter.

IsNew. IsReadOnly is true if the object is new, false otherwise. (It should be noted that an object is new if it has not been persisted yet. In other words, stored through entity persistence 12 of FIG. 1.)

IsNotNew. IsReadOnly is true if the object is not new, false otherwise.

PropertyIsReadOnly. Depends upon another property's IsReadOnly status.

PropertyIsNotReadOnly. Depends upon another property's IsReadOnly status.

PropertyIsValid. Depends upon another property's or the current property's IsValid status.

PropertyIsNotValid. Depends upon another property's or this property's IsValid status. In the example illustrated in FIG. 8, the read only status is true when the corresponding object is new, i.e. it has not yet been persisted. The metadata providing read-only status is indicated at 716.

As stated above, the modes PropertyIsReadOnly, PropertyIsNotReadOnly, PropertyIsValid and PropertyIsNotValid can be determined based upon another property's IsReadOnly or IsValid status. A validation attribute IsReadOnlyPropertyLink provides a mechanism to name the associated property. In the illustrated in FIG. 9, the readonlyness for the property is determined by the readonlyness of another property, which is indicated at 718 in FIG. 9. It should be noted that if the parameter setting for the IsReadOnlyMode is either. PropertyIsReadOnly or PropertyIsNotReadOnly then the parameter IsReadOnlyPropertyLink must also be specified and cannot be the same property. Whereas if the parameter IsReadOnlyMode is either PropertyIsValid or PropertyIsNotValid, then if the parameter IsReadOnlyPropertyLink is specified, the readonlyness of the current property is determined by the property specified by IsReadOnlyPropertyLink. Otherwise, if the parameter IsReadOnlyPropertyLink is not specified, then the current property is assumed to be controlling. In other words, the current property is read only depending upon whether or not the associated property value is valid.

At this point, it should be noted that the order in which properties are set can be achieved in two different ways, depending upon if any PropertyValidator has a parameter IsReadOnlyMode of the "manual" mode. If any such property does, then property ordering will have to be calculated through a dynamic approach. In the dynamic approach, all the properties are examined where those properties with IsReadOnly equal to "false" are then set. All the properties are then examined again, skipping the properties that have already been set, but in this instance the approach looks for and sets those properties that just had there IsReadOnly parameter changed from true to false. This process continues until no more properties have had there IsReadOnly value change from true to false. If desired, this information, or some of it, may be possible to cache, but for reliability reasons, this process needs to be repeated for every instance and for every type.

If however, no properties have the parameter IsReadOnlyMode of the "manual" mode, then property ordering can be determined through a static approach. In the static approach, all the properties are examined and a graph is built based on dependencies to each other as specified. The resulting graph is sorted and traversed breadth-first, where the first property being set has IsReadOnly value equal to false. Likewise, any other such properties having IsReadOnly value of false are also set. At this point, the graph is traversed based on the dependencies provided therein. As appreciated by those skilled in the art, the graph can be cached if desired based on the object's type. The static approach may be particularly advantageous during importation of data where a graph can be established for the properties. Upon receipt of the data for the properties, the properties can be set based on the stored dependencies. In contrast, for data entered through a user interface, the dynamic approach probably will most likely be implemented.

The foregoing discussion provides property validation for entities or objects. In a further embodiment, property validation can be performed at two different levels in the database system. In a first level, property validation is performed upon or is performed with entering of data directly by consumer or through importing data as discussed above. This level of validation can be performed prior to permanent storage of the data in the database system through entity persistence 12 of FIG. 1. Thus, an application author can provide instructions executable on one or more input machines to provide property validation as data is inputted.

In the alternative or in addition, property validation can also be provided at a "service" level where property validation code resides with or is associated with entity persistence 12. This level of property validation operates substantially similar to that described above and serves to recheck the property values prior to final entity persistence, or to validate properties that should or can only be validated at the service level. This level of property validation can be particularly advantageous in database systems where one or more consumers operating at the "agent" level are not considered trusted, or if the validation has to occur within a database transaction, such as what would need to happen if performing referential integrity validation. Validation at the service level is typically running under the context of a database transaction. Property validation at the "service" level can be invoked upon receipt of an entity for persistence, which usually entails that the entity has obtained "valid" status as it pertains to the agent.

In addition to performing property validation at a "property" level, each entity or object as a whole can be validated, which entails confirming the validation of each property contained therein. Referring to FIG. 4, at the "agent" level, the entity is checked for validation before sending the entity to the server for persistence or other operation that would not be able to complete successfully unless the entity is valid. In other words, entity validation comprises validating each of the properties forming the entity, and upon successful validation thereof, changing the status of the entity to be "valid". A method IsValid is provided for performing validation, while a cancelable event identifying that validation is occurring can be issued. As with property validation, entity validation can also be rechecked or further validated at the "service" level before the entity or object is persisted. Again, a method IsValid is provided for performing validation, while a cancelable event identifying that validation is occurring can be issued. Thus, validation can be performed at a property, agent and/or service level. For example, if validation is only desired at the service level, DelayIsValidUntilService of IPropertyValidator can be used. As appreciated by those skilled in the art, other mechanisms for selecting where to perform validation can also be used.

When validation is used on an object or entity, an exception or error can be raised upon the occurrence of the first error and subsequently with each other error encountered. In a further embodiment, all validation can occur for the entire object and the integers can be collected and returned as a set, if desired. Warnings or other information can be provided if desired as well.

Validation on an object or entity also issues validation events, similar to the validation events on the property. This extensibility mechanism allows further validation for the type.

In a further embodiment, PropertyBindingManager as illustrated in FIG. 4 provides a mechanism such that if a list of objects and/or agents of the same type are being accessed for example, through a user interface, one does not have to subscribe to property events and agent events for each agent, but rather once for the whole list. PropertyBindingManager maintains the active agent and the event subscriptions for the property and agent events. For instance, in a list of agents, one agent may be active at any one time and having to clear out the old PropertyObject event subscriptions associated with the previous agent and interact with the new PropertyObject event subscriptions with respect to the new agent can hamper performance. Thus, reference to the agent (CurrentAgent) is obtained from the PropertyBindingManager's current agent. As stated above, PropertyBindingManager allows a one-time subscription to a list of agent and property events since the agents are of the same type and provides a mechanism to keep track of the active agent and associated event subscriptions.

Appendix

The following description is provided for the purpose of explaining the use of an EntityKey in the exemplary embodiment described above. Discussion will first begin with an overall view of a concept herein referred to as Containment Hierarchy which the EntityKey supports. A brief discussion of other keys is also provided for the sake of completeness.

Containment Hierarchy

Figure 10:
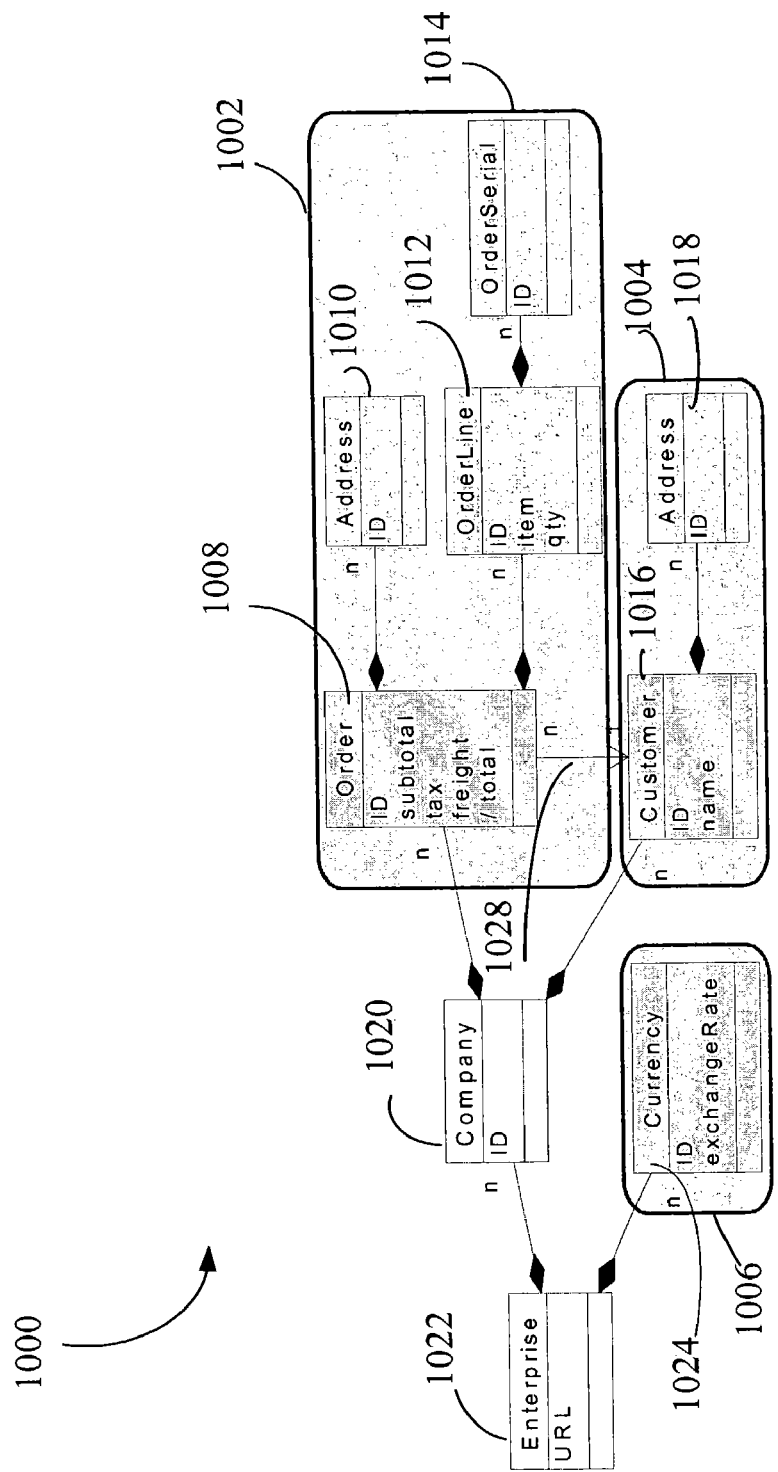
FIG. 10 is a pictorial representation of a containment hierarchy.

FIG. 10 is an example of a hierarchical structure 1000 of an exemplary application comprising objects or entities. As illustrated, entities can be organized as components 1002, 1004 and 1006, which can comprise one or more entities. A component, as used herein, is one or more entities grouped together to achieve a common purpose. Although modules implementing the present invention may not include references to components, a developer may want to design the application with components in mind.

In the exemplary embodiment, the entities or objects are organized in a parent/child relationship. Component 1002 includes those entities that constitute an Order for a company. In particular, an Order entity 1008 includes information such a subtotal, tax, freight and total properties. An Address entity 1010 is a child entity of the Order entity 1008 and may include information pertaining to the shipping address for a specific order. Likewise, the Order entity 1008 may include a number of OrderLine entities 1012, while each OrderLine entity 1012 can comprise one or more OrderSerial entities 1014 having further information. It should be noted that the notation "n" in FIG. 10 is used to indicate that the particular entity could comprise a number of identically structured entities. For example, as indicated above, one or more OrderSerial entities 1014 can be a child entity (indicated by the diamond line) of an OrderLine entity 1012.

In the example herein illustrated, component 1004 generally pertains to Customer information and includes a Customer entity 1016, where each Customer entity 1016 can include one or more Address entities 1018.

The Customer entities 1016 and the Order entities 1008 are each child entities of a Company entity 1020, the set of which comprise child entities of an Enterprise entity 1022. Component 1006 comprising, in this example, one or more currency entities 1024 is also a child of the Enterprise entity 1022.

Besides the parent/child hierarchy of structure 1000, there also exists, in this example, a uni-directional association between classes of entities. A class is a set of similarly structured entities. As indicated above, all of the Order entities 1008 fall within an Order class. Likewise, the Customer entities 1016 pertain to a Customer class. The association indicated by arrow 1028 denotes that a class may know of another class. In this example, the Order class knows about the Customer class, but does not incorporate or own it such as in the case of a parent/child relationship.

Entity Key

An entity manages data. The entity preserves its internal data and the integrity of its relationships with other entities. Data of the entity is accessed through properties. Each entity is a form of an abstraction. Characteristics of an entity also include that it has an identity, represented by a subclass of an abstract class "EntityKey". Within the overall hierarchy, each entity that manages data in structure 1000 is location independent in that it does not know where it is stored or who owns it. However, the EntityKey is used to define its relationship with other entities and can be thought of as being represented by the connections in FIG. 10.

An instance of an entity may be contained within an instance of another entity. The contained entity is called the child, while the container is called the parent. A child instance cannot exist longer than its parent and must have one and only one parent. The set of all such relationships for an application is its containment hierarchy. This sort of hierarchy parallels many business applications. It has been found that supporting this hierarchy makes the system a better fit for developers in constructing business applications.

FIG. 10 is an example of a containment hierarchy for an application. The containment hierarchy describes the types of entities and their corresponding parent-child relationships. There is a root of the containment hierarchy, herein illustrated as the "Enterprise" container 1022. The root container or entity commonly supplies the address of a server for the containment hierarchy, although classes or instances can be located on other servers or computer readable media. In one embodiment, the root entity supplies the URL (Universal Remote Locator) of the server. In this embodiment, another broad class of containers are the Company entities 1020.

It should be noted that the containment hierarchy is not the same as an inheritance hierarchy. Inheritance hierarchy is a classification of relationships in which each item except the top one is a specialized form of the item above it. In the example of FIG. 10, the Order class 1008 and the Customer class 1016 are not specialized forms of the Company class 1020. Rather, the Order class 1008 and the Customer class 1016 are different classes holding different types of information. This is not to say inheritance can not be present in the Containment Hierarchy. In some embodiments, an inheritance hierarchy may be present for any class. Thus, for example there can be variations within a class such as variations of the Customer class 1016

There are three forms of entities in an application. The forms include the component containers "Enterprise" 1022 and "Company" 1020, primary entities and supporting entities. The primary or root entity is the focus of a component container of the same name, while supporting entities are either children of the primary entity or its peers. For example, the Order component 1002 consists of the Order root entity 1008, while the Address 1010, OrderLine 1012 and OrderSerial 1014 are supporting entities. The data for entities is usually stored in database tables such as described above with respect to FIG. 1. Components are a unit of logical design and do not interact with the database.

As indicated above, each of the properties in an entity 20 is mapped to a corresponding entity table 26 and a specific column 28 in a given entity table 26 as illustrated in FIG. 1. Each entity table also includes, in addition to columns for the attributes, one or more columns that identify all the parents of a particular entity. Referring to FIG. 15 and using OrderSerial by way of example, the OrderSerial Table 1050 would include columns for identifiers, in particular, "Company_id" 1052, "Order_id" 1054, OrderLine_id 1056 and Serial Number 1058, which may comprise one of the attributes, and which may function as its own identifier (id).

In a relational database, interaction with the table would require specifying each of the identifiers in order to identify and work with the data associated with a particular entity, in this example, data associated with a specific OrderSerial entity 1014. However, this information is inferred from its parent in the containment hierarchy. For instance, if one is working with a particular OrderLine entity 1012 and now wants to inquire about, or perform an action upon, a OrderSerial entity 1014, the data access system 12 can ascertain which OrderSerial entity or entities the user is referring to without needing to reidentify the parents of the entity. In the present invention, the containment hierarchy allows the relationship of the tables (i.e., the identifiers such as illustrated in FIG. 15), and hence, the relationship of the entities, be an implicit background piece of information. In other words, the identity of the entity is inferred from parent/child relationship so that it doesn't need to be restated or managed in other ways. In a relational database system, the identifiers found in the tables used to identify the entity are called a primary key, wherein the combination of the identifiers is unique. However, typically, primary keys are just a collection of columns and have no rich behavior attached to them. In addition, user selected identifiers may only be unique within a certain scope (such as a single business unit) and not unique over the entire range of the application. Surrogate keys, which are commonly generated by the application and hidden from the user, may be unique, but they do not describe hierarchies such as who is the parent of the entity referred to by the identifier.

Another aspect of the present invention is an EntityKey that solves these problems, in particular, the EntityKey associated with each entity allows each entity to be unique throughout the containment hierarchy, as well as infer from the position of the entity within the containment hierarchy who the parents are. An entity is an object that is identified by an entity key, or stated differently, the key for an entity. An EntityKey serves the same function as the primary key on a relational table; however, unlike a relational primary key it is universally unique across the application space and is hierarchical, i.e. it is aware of its position in the hierarchy. In the architecture, the EntityKey is a defined class that is distinct from the entities. The EntityKey class can be mapped to a relational database table in a manner similar to entity 20, class-table mapping 18 and entity table 26. Every entity throughout the hierarchy has one and only one EntityKey value. Given the key for an entity, one can retrieve the entity, whether it is on a local server, or located in a wide area network such as the Internet.

Figure 11:
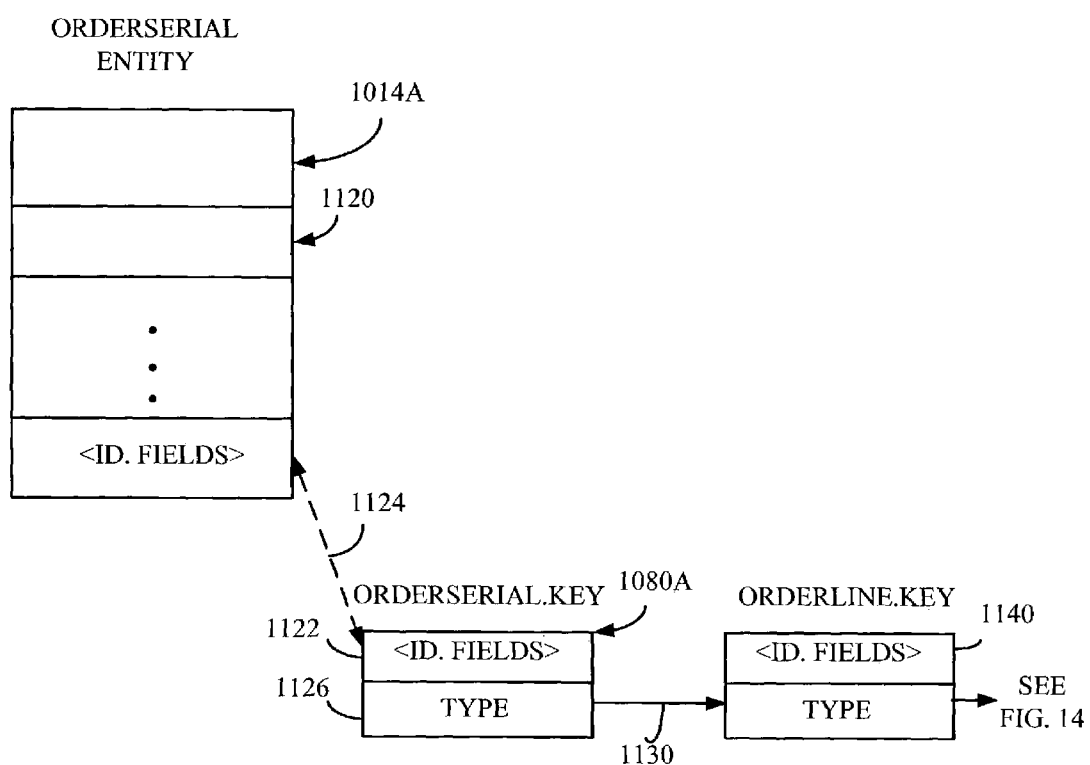
FIG. 11 is pictorial representation of an entity and an entity key.

Each EntityKey contains, for purposes of this concept, three pieces of information: the type or class of the entity to which it refers, the ID of that entity to which it refers and information as to the EntityKey of the parent to that entity. FIG. 11 is a pictorial representation of an EntityKey (herein, OrderSerial.Key) 1080A for a particular OrderSerial entity 1014A.

Figure 12:
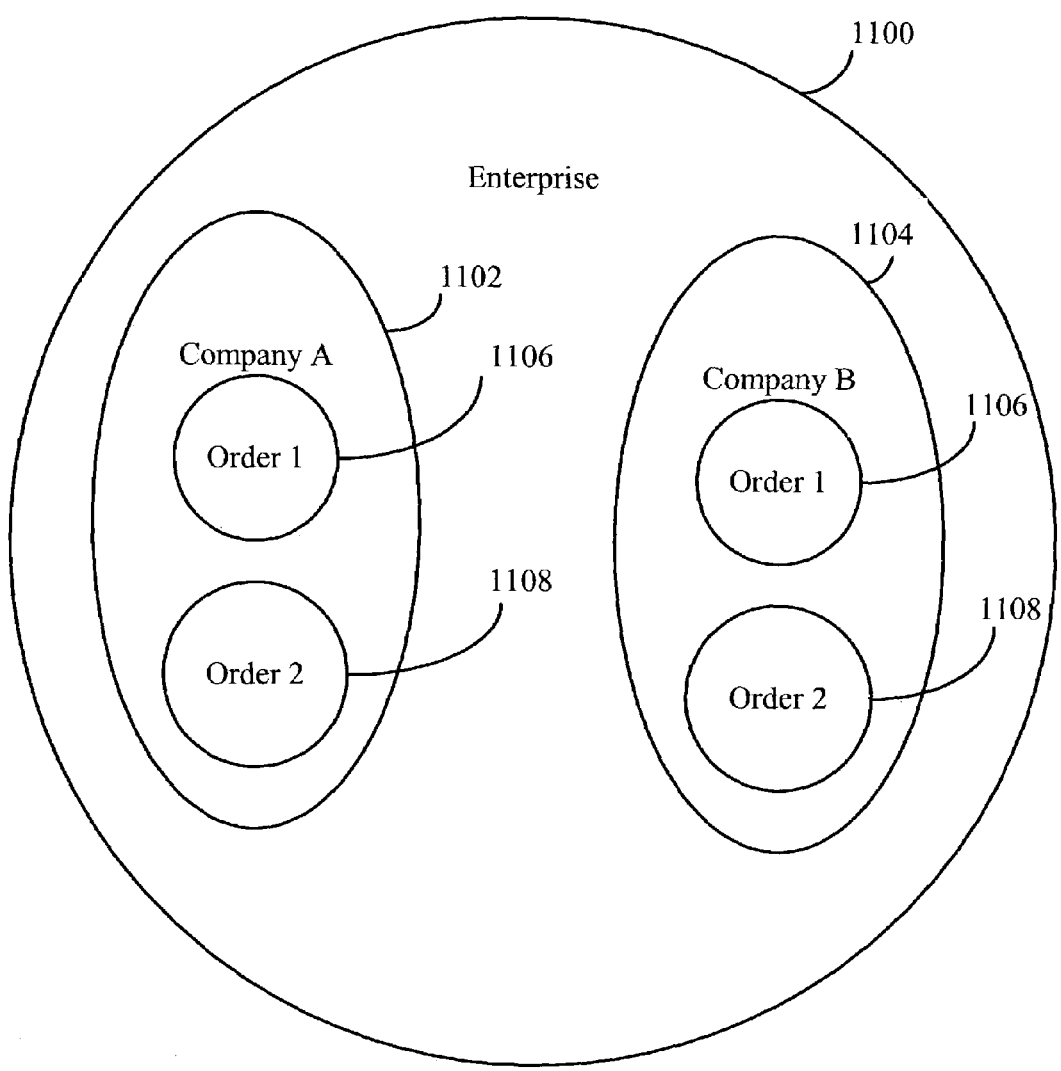
FIG. 12 is a pictorial representation of a business application.

An entity in the hierarchy is fully identified by its identifier plus that of its parents. In this manner, the same local identifier can be used in two or more locations of the overall space because different parents would be involved in uniquely identifying the entity. This may be more readily apparent by pictorially representing the Enterprise space of FIG. 10. Referring to FIG. 12, the Enterprise is indicated by circle 1100. The Enterprise 1100 can include a plurality of companies, herein Company A 1102 and Company B 1104. However, each Company 1102 and 1104 can have two Orders, both having the same identifier, herein "Order 1" 1106 and "Order 2" 1108. Nevertheless, entities within Company A 1102 would still be uniquely identified with respect to entities of Company B 1104 although the identifiers for Order 1 1106 and Order 2 1108 have been used within each Company because each of the entities is uniquely identified by its associated key having the parent/child relationships of the hierarchy.

It should be noted that in many applications, the data for Company A is stored in a completely different database then the data for Company B.

There is also a separate, independent class associated with OrderSerial 1014 herein identified as OrderSerial.Key. In general, the EntityKey is of a separate class than the class it refers to. Entity 1080A is an example of an object of the OrderSerial.Key class. Referring back to FIG. 11, the OrderSerial entity 1014A contains all the attributes 1120 relevant to the Order Serial, which could be any number of attributes. The OrderSerial.Key 1080A contains a subset of one or more attributes of the OrderSerial entity 1014A specifically, the OrderSerial.Key includes identifier attributes 1122. Thus, if OrderSerial entity 1014A includes a thousand attributes, but two of the attributes make each OrderSerial entity unique, those attributes get copied into the OrderSerial.Key to form the identifier back to the entity. Arrow 1124 represents the common identifier attribute or attributes between entity 1014A and entity 1080A.

The attribute or attributes of the OrderSerial.Key that make each entity of OrderSerial unique is the first element of an EntityKey, which thereby allows the key to be associated with a particular entity.

A second element of an EntityKey is the type 1126 of the entity to which it has an identifier. In the present example, the type of the class is OrderSerial.

A third element of an EntityKey is information about the EntityKey of the parent of the entity. In the present embodiment, this information is a reference, indicated by arrow 1130, to the parent key 1140 corresponding to the parent of entity 1014A. In other words, the third element could be a reference to another key. This structure makes EntityKeys recursively defined However, it should be understood that some or all of the parent key information could be stored in the EntityKey directly, if desired. It should be understood that these forms and other similar forms for storing and accessing EntityKey information is intended to be covered herein.

Figure 13:
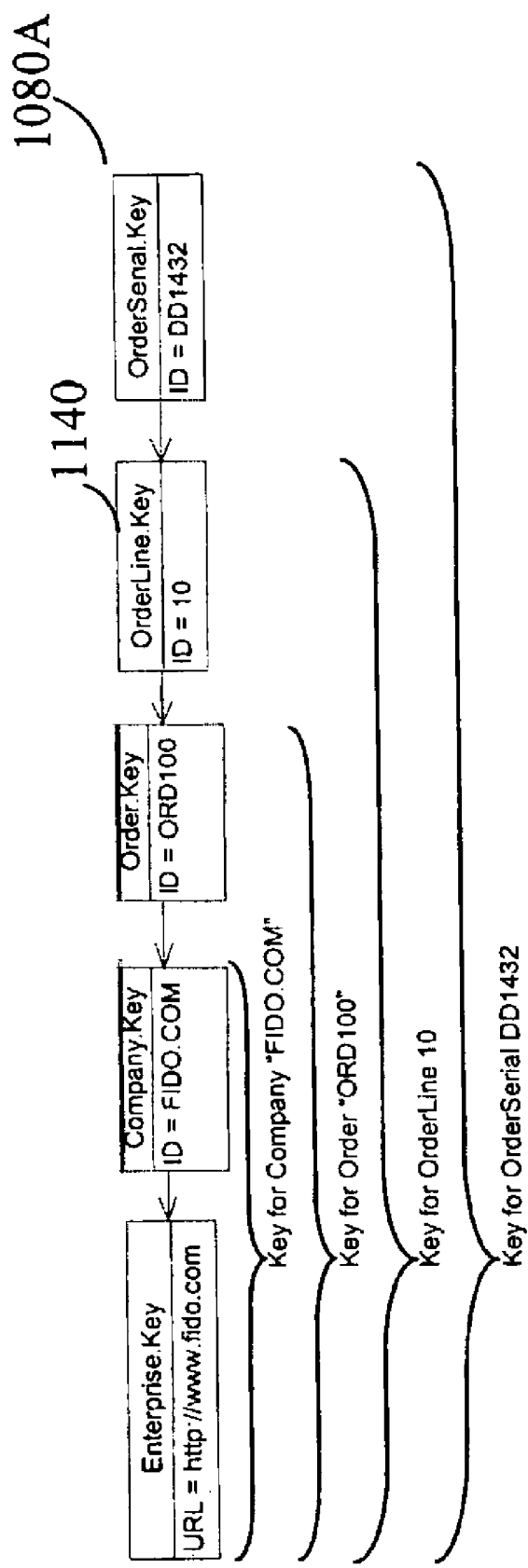
FIG. 13 is a pictorial representation of an entity key.

Referring now to FIG. 13, EntityKeys are provided for an entity of Company, an entity of Order, an entity of OrderLine and entity of OrderSerial. In this example, the ID constitutes one field and the type can be ascertained from the name of the key. For example, type OrderSerial is obtained from the name OrderSerial.Key. References to parent keys are illustrated by arrows. Thus, again, the location of an entity in the hierarchy is completely defined by the associated EntityKey.

In the recursive form of storing EntityKeys, it should be noted that although each EntityKey includes type or class information to which it pertains it does not know the type or class of its parent. That information is found by looking at the type information in the parent key that it references. This is a particularly advantageous feature for it allows classes to be reused throughout the containment hierarchy. Referring back to FIG. 10, it is illustrated that the Order class 1008 has a child class of Address 1010. Likewise, the Customer class 1016 also has a child class of Address 1018. The Address classes 1010 and 1018 are actually conceptually the same; but the instances are disjoint since they are under different parents. However, the entities are uniquely defined in each form of Address class, wherein each Address class 1010 and 1018 may be stored in a different database table. In this manner, one can describe a position in the containment hierarchy without forcing a class to forever be in that position.

As explained above, each EntityKey has information such as a reference to its parent key, but it does not know what type of parent it is. The decision of what type of parent is made or defined by the mapping(s) 18 illustrated in FIG. 1 for the complete set of classes and tables.

The set of identifiers 1122 as illustrated in FIG. 11 of an EntityKey corresponds to the primary key columns of a table holding the data for that entity. Referring to FIG. 15, assume that the primary key of the table holding OrderSerial entities is Company_ID 1052, Order_ID 1054, OrderLine_ID 1056, and Serial Number 1058. The identifier attribute 1122 in the OrderSerial.Key 1080A is mapped directly to the last of the primary key columns, while the parent keys of 1080A are mapped to columns 1052, 1054, 1056 in a similar fashion. This EntityKey to database key correspondence also extends to foreign keys. All simple associations between entities are implemented using keys. For example, in FIG. 11, Order.Key would have a reference of type Customer.Key that implements the association from Order to Customer. This key can easily be mapped to the Customer foreign key in the Order table.

It should also be noted that tables are commonly designed with surrogate rather than intelligent keys. An intelligent primary key is seen and specified by the end user, while a surrogate primary key is generated by the application and hidden from the user. Surrogate keys are often used to allow renaming the user visible identifier of a table without database impact or to save space when the size of the primary key is very large and often referenced in foreign keys. When surrogate keys are used, the table will have the surrogate primary key and an alternate key having the user visible identifier.

Both intelligent and surrogate EntityKeys are supported. In the present embodiment, if a surrogate EntityKey is used its ID properties are private (since they are generated and hold ho meaning to the consumer of the entity); otherwise they are public.

Class Key

A second related abstraction is the Class Key. Since a given entity can be used in more than one place in the containment hierarchy, there is a mechanism for indicating which node in the hierarchy to process. The Class Key is that mechanism and contains two pieces of information: the type of the entity to which it refers and information as to the Class Key of the parent of the entity. Note the similarity to the definition of the EntityKey. In fact, the EntityKey is a derivative of and inherits from the Class Key, thereby allowing an EntityKey to be supplied anywhere a Class Key is required. Thus the Class Key is also hierarchically defined. The illustration of FIG. 13 of an EntityKey can be changed into an illustration of a Class Key by simply removing the entity identifiers (IDs).

Generally the Class Key can be used to reference a node in the containment hierarchy as it pertains to classes of entities, particularly describing uniquely a name for each class in the hierarchy as well as its position in the hierarchy. In contrast, the EntityKey provides a unique name for each entity in the containment hierarchy and describes its position in the hierarchy.

The EntityKeys and Class Keys are used when performing create, read, update and delete operations on business objects or entities. For example, when reading an entity, a parent key referring to a component container should be provided. This provides a scope for the read and also makes it easier for the developer to specify a complex location in the hierarchy.

Figure 14:
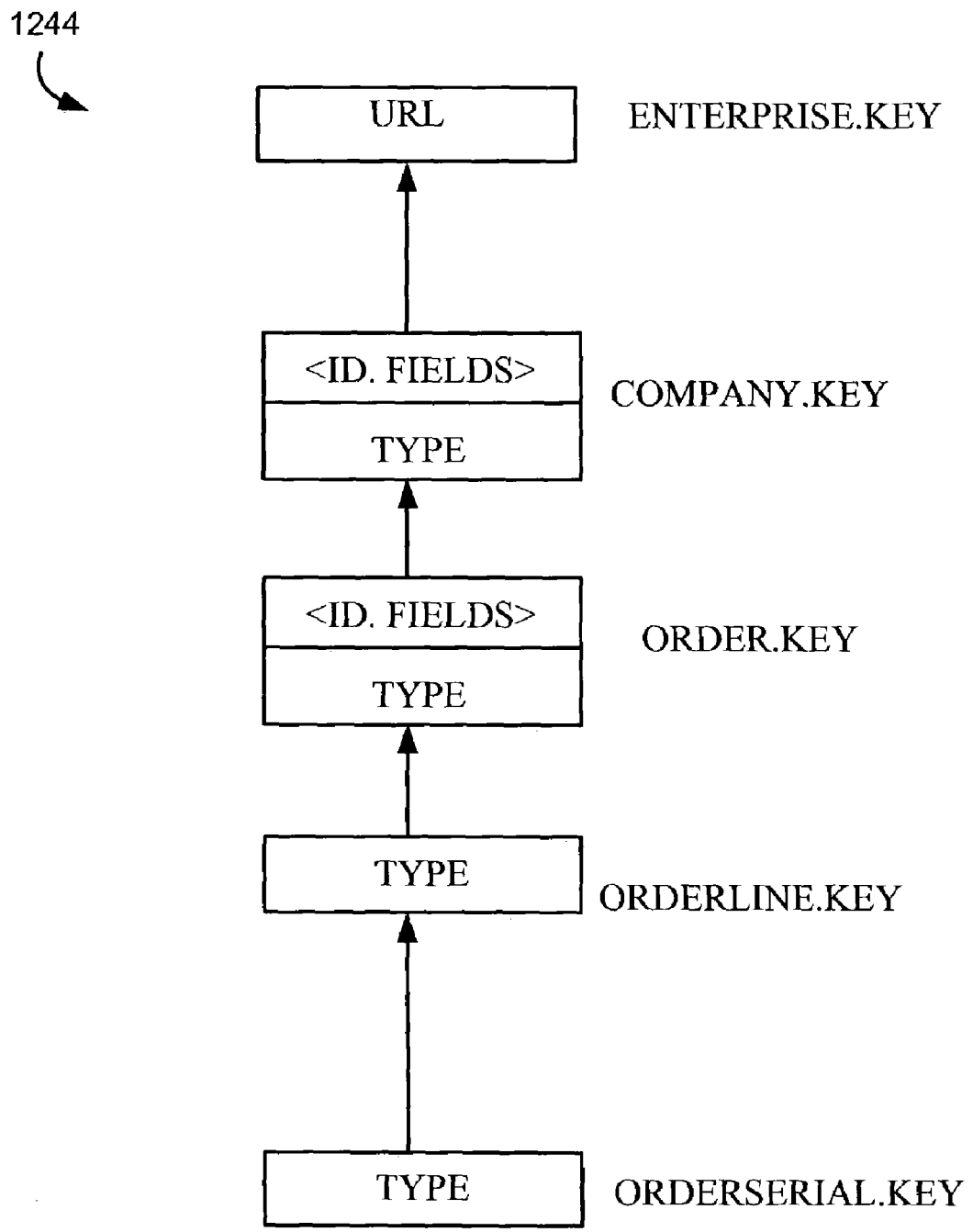
FIG. 14 is a pictorial representation of a blended key.

Besides EntityKeys and Class Keys, another form of key is a blend between these keys. As discussed above, an EntityKey is a form of a Class Key, but includes further information to a particular entity (i.e., its identifier attributes). By simply using a chain of Class Keys followed by Entity Keys, all the entities under a particular parent can be ascertained. FIG. 14 illustrates an example of a blended key 1244. In this example, EntityKeys have been provided for the Enterprise, Company and Order, which in turn has specified a particular Order entity. However, since the OrderLine.Key and the OrderSerial.Key do not include Ids, they are Class Keys. The blended key 1244 of FIG. 14 could be received by the data access system 12 to formulate a query for data store mechanism 14 to retrieve all series for a particular order, irrespective of line.

Although the present invention has been described with reference to particular embodiments, workers skilled in the art will recognize that changes may be made in form and detail without departing from the spirit and scope of the invention.

What is claimed is:

1. A computer storage medium having instructions comprising a framework for validating data in a database system, the instructions comprising:
   identifying at least one property of an entity to be validated;
   identifying constraint information;
   forming an object of said at least one property, wherein
      identifying constraint information
      comprises referencing a reference stored within the object, the reference being indicative of the constraint information which is stored outside of the object itself, and wherein the constraint information is referenced within a property validator object that is separate from the object, and also separate from the entity to be validated; and
   applying the constraint information so as to ascertain validity of said at least one property,
      wherein identifying constraint information comprises identifying criteria of whether a value of the property can be changed, wherein the criteria identifies that the value can be changed as a function of a status value of another property, wherein the status value comprises whether said another property is changeable, and wherein the status value comprises whether said another property is valid.

2. The computer storage medium of claim 1 and further comprising identifying a validator as a function of a type of said at least one property, the validator being of a class of validator.

3. The computer storage medium of claim 1 and further comprising identifying events to be issued during validation.

4. The computer storage medium of claim 3 wherein an event to be issued comprises a notification that a value of the property is changing.

5. The computer storage medium of claim 3 wherein an event to be issued comprises a notification that a value of the property has changed.

6. The computer storage medium of claim 3 wherein an event to be issued comprises a status of the property has changed.

7. The computer storage medium of claim 6 wherein the status comprises whether the value of the property is changeable.

8. The computer storage medium of claim 7 wherein the status comprises whether the value of the property is valid.

9. The computer storage medium of claim 1 wherein identifying constraint information comprises identifying valid criteria for a value of the property.

10. The computer storage medium of claim 1 wherein the criteria identifies that the value can be changed anytime upon execution of the instructions.

11. The computer storage medium of claim 1 wherein the criteria identifies that the value can be changed as a function of creation of a corresponding entity.

* * * * *